United States Patent
Curtis et al.

(10) Patent No.: US 10,766,127 B2
(45) Date of Patent: Sep. 8, 2020

(54) NOSEPIECE ASSEMBLY WITH A PASSAGE FOR EJECTING DEBRIS

(71) Applicant: Black & Decker Inc., New Britain, CT (US)

(72) Inventors: Talon Curtis, Fallston, MD (US); James D. Hays, Bel Air, MD (US); Rex A. Marshall, Jr., White Marsh, MD (US); Larry E. Gregory, Baltimore, MD (US); Evan Cain, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 201 days.

(21) Appl. No.: 15/972,673

(22) Filed: May 7, 2018

(65) Prior Publication Data

US 2019/0337132 A1 Nov. 7, 2019

(51) Int. Cl.
*B25C 1/00* (2006.01)
*F16B 15/08* (2006.01)

(52) U.S. Cl.
CPC ............. *B25C 1/003* (2013.01); *B25C 1/008* (2013.01); *F16B 15/08* (2013.01)

(58) Field of Classification Search
CPC ......... B25C 1/001; B25C 1/188; B25C 1/182; B25C 1/184
USPC .................................................. 227/135–136
See application file for complete search history.

(56) References Cited

U.S. PATENT DOCUMENTS

| 3,232,511 | A | 2/1966 | Crooks |
| 3,693,863 | A | 9/1972 | Black |
| 4,186,862 | A * | 2/1980 | Klaus ..................... B25C 1/04 227/130 |
| 4,784,308 | A | 11/1988 | Novak et al. |
| 5,337,635 | A | 8/1994 | Habermehl |
| 5,469,767 | A | 11/1995 | Habermehl |
| 5,699,704 | A | 12/1997 | Habermehl |
| 6,422,447 | B1 | 7/2002 | White et al. |
| 6,488,195 | B2 | 12/2002 | White et al. |
| 6,499,643 | B1 | 12/2002 | Hewitt |

(Continued)

FOREIGN PATENT DOCUMENTS

| EP | 1391616 A2 | 2/2004 |
| EP | 3213872 A2 | 9/2017 |
| WO | WO-2011/100092 A1 | 8/2011 |

OTHER PUBLICATIONS

Extended European Search Report dated Nov. 6, 2019 in counterpart European Patent Application No. 19172292.5.

*Primary Examiner* — Praachi M Pathak
(74) *Attorney, Agent, or Firm* — Harness, Dickey & Pierce, P.L.C.

(57) ABSTRACT

A nosepiece assembly includes a first nosepiece portion including a fastener guide. The fastener guide has a support ledge to position a first fastener of a collated strip of fasteners in a drive channel. The nosepiece assembly also includes a second nosepiece portion connected to the first nosepiece portion opposite to the fastener guide with the first and second nosepiece portions defining the drive channel therebetween and defining a debris ejection passage therebetween. The debris ejection passage extends between the drive channel and a debris ejection aperture on an exterior surface of the nosepiece assembly.

18 Claims, 10 Drawing Sheets

(56) References Cited

U.S. PATENT DOCUMENTS

| | | | |
|---|---|---|---|
| 6,568,302 B2 * | 5/2003 | Tucker | B25C 1/184 227/136 |
| 6,672,498 B2 | 1/2004 | White et al. | |
| 6,708,821 B2 | 3/2004 | Tucker et al. | |
| 6,763,991 B2 | 7/2004 | Hamano | |
| 6,808,101 B2 | 10/2004 | Laubach et al. | |
| 6,892,922 B2 * | 5/2005 | Tucker | B25B 23/045 227/10 |
| 7,922,054 B2 | 4/2011 | Cole, Jr. | |
| 2003/0146262 A1 * | 8/2003 | Hwang | B25C 1/005 227/113 |
| 2004/0035906 A1 * | 2/2004 | Tucker | B25B 23/045 227/142 |
| 2012/0000031 A1 * | 1/2012 | Liu | B25C 1/08 15/339 |
| 2015/0014388 A1 * | 1/2015 | Moriwaki | B25C 1/188 227/119 |

* cited by examiner

NOSEPIECE ASSEMBLY WITH A PASSAGE FOR EJECTING DEBRIS

FIELD

The present disclosure relates to a nosepiece assembly with a passage for ejecting debris.

BACKGROUND

This section provides background information related to the present disclosure which is not necessarily prior art.

Fastening tools, such as power nailers have become relatively common place in the construction industry. Such nailers can include pneumatically-powered nailers, which are connected to an air compressor via an air hose, powder nailers, which employ a powder fuel source that is rapidly combusted to produce a volume of pressurized gas, and cordless electric nailers, which utilize an electric motor powered by a battery.

Such powered nailers can use strips of collated nails that are inserted into a magazine of the nailer. The nails separate from the collated nail strips when the nails are driven individually into workpieces by the powered nailers. The driver assembly of the powered nailers separates the individual nails from the collated strips of nails in addition to driving the nail into the workpiece. When the individual nails are separated from the collated strips during the nail-driving process, debris from the collation can be generated that can collect in the drive channel of the powered nailer and cause jams or other operational issues.

SUMMARY

This section provides a general summary of the disclosure, and is not a comprehensive disclosure of its full scope or all of its features. In addition, any feature or combination of features included in this general summary is not necessarily critical or particularly important to the disclosure.

In accordance with an aspect of the disclosure, a nosepiece assembly includes a first nosepiece portion including a fastener guide. The fastener guide has a support ledge to position a first fastener of a collated strip of fasteners in a drive channel. The nosepiece assembly also includes a second nosepiece portion connected to the first nosepiece portion opposite to the fastener guide with the first and second nosepiece portions defining the drive channel therebetween and defining a debris ejection passage therebetween. The debris ejection passage extends between the drive channel and a debris ejection aperture on an exterior surface of the nosepiece assembly.

In accordance with another aspect of the disclosure, a powered fastening device nosepiece assembly includes a drive channel defined by a first nosepiece portion and a second nosepiece portion. The drive channel extends longitudinally between the first nosepiece portion and the second nosepiece portion and is adapted to receive a drive blade that moves longitudinally in the drive channel toward a nose to cause a first fastener of a collated strip of fasteners to be driven from the nose and into a workpiece. The first nosepiece portion and the second nosepiece portion define a debris ejection passage that is in communication with the drive channel and positioned outward therefrom such that debris located in the drive channel exits from the nosepiece assembly in a direction away from the drive channel through the debris ejection passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
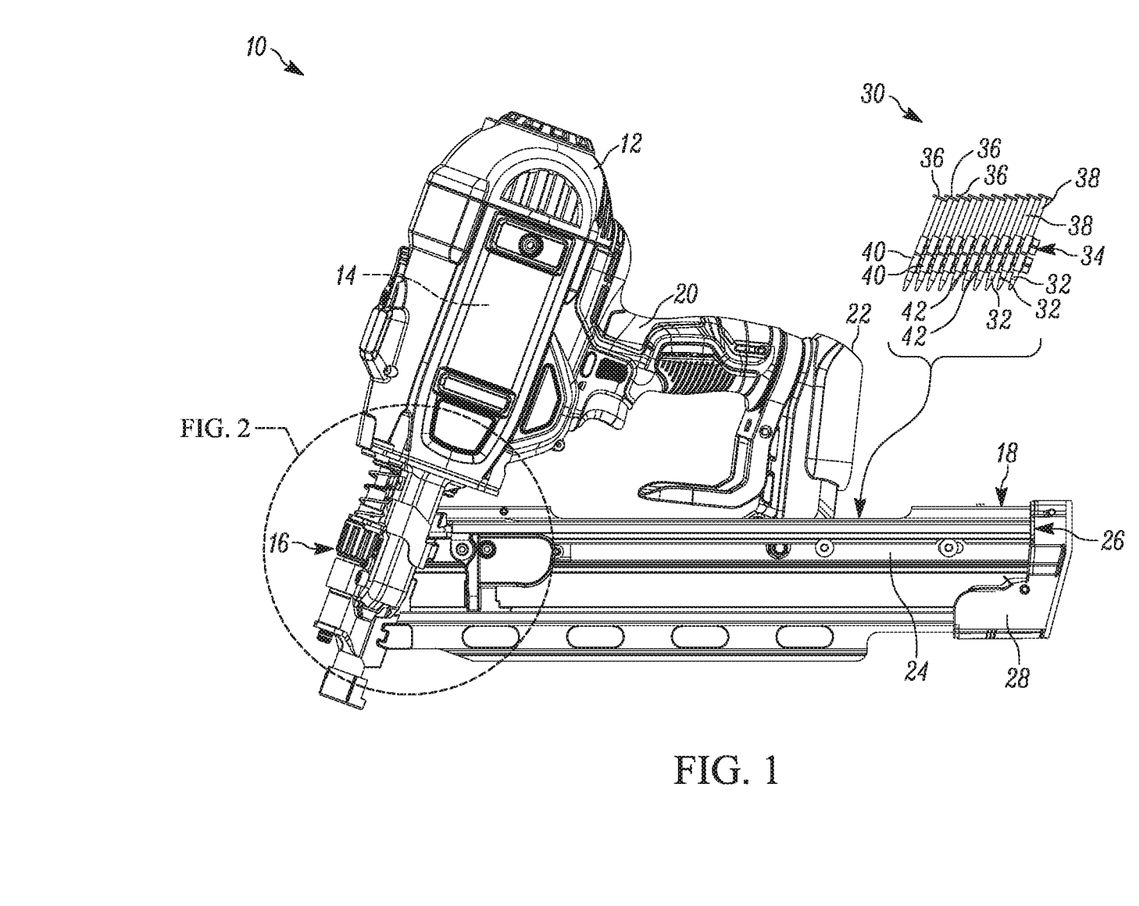
FIG. 1 is a side view of an exemplary powered nailer, including one example of a nosepiece assembly with a passage for ejecting debris constructed in accordance with the teachings of the present disclosure.
Figure 2:
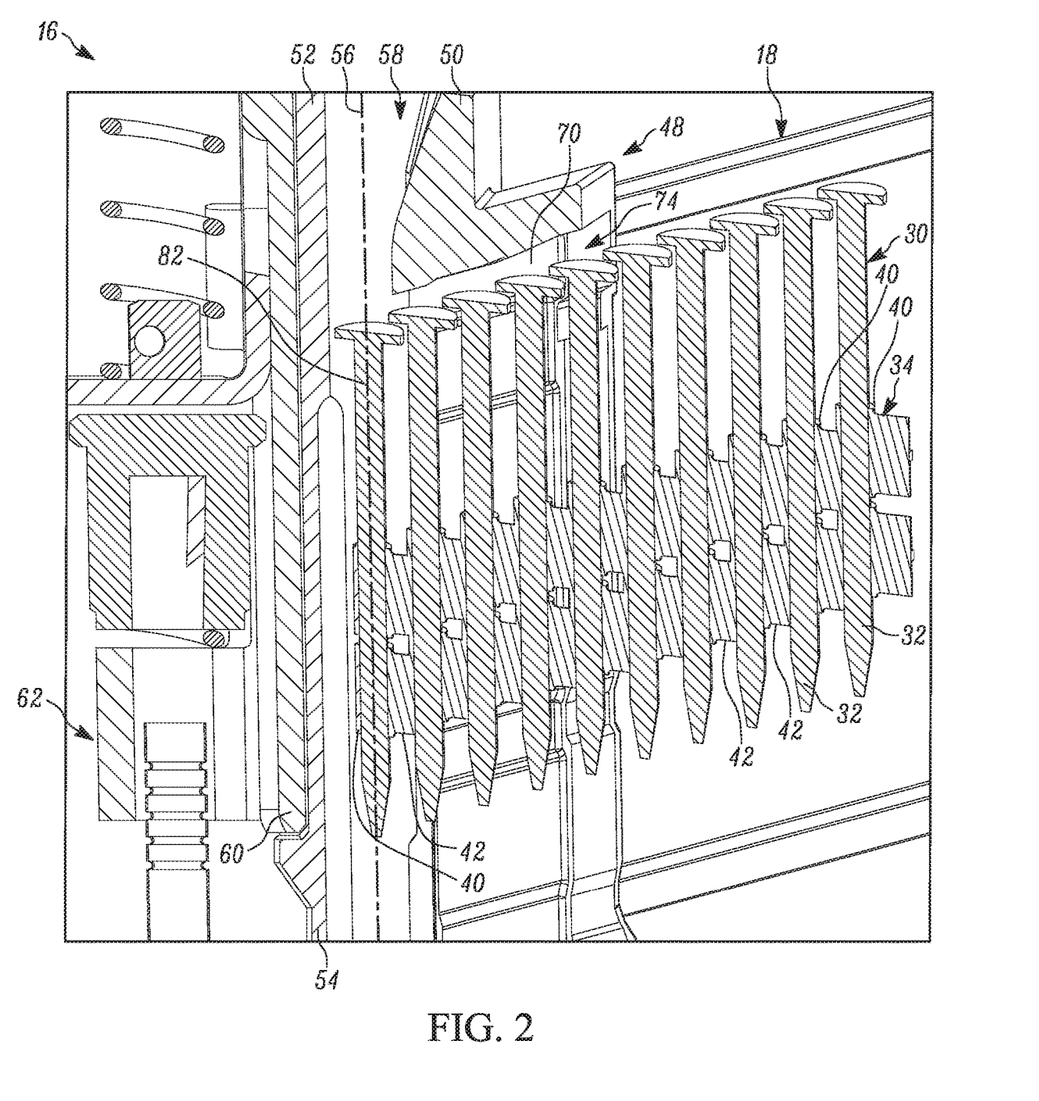
FIG. 2 is a sectional view of a portion of the exemplary powered nailer of FIG. 1 as shown along a section plane through the center of the magazine and the nose assembly.

With reference to FIGS. 1 and 2 of the drawings, a powered nailer constructed in accordance with the teachings of the present disclosure is generally indicated by reference numeral 10. The powered nailer 10 can include a housing 12, a drive motor assembly 14, a nosepiece assembly 16, and a magazine assembly 18. The drive motor assembly 14 can be constructed in a conventional manner and as such, need not be described in detail herein. The housing 12 can be of a clam-shell construction that can be employed to cover various components of the nailer 10, such as the drive motor assembly 14 and related control components. The housing 12 can form a handle 20 that can be grasped by the operator of the nailer 10 during use. The housing 12 can also form a battery pack mount 22 to which the battery pack (not shown) can be fixedly but removably coupled.

As further shown, the magazine assembly 18 extends away from the nosepiece assembly 16 and is supported by a portion of the housing 12 located adjacent the battery pack mount 22. The magazine assembly 18 can be constructed in a conventional manner to hold a plurality of nails 30 and to feed such nails toward the nosepiece assembly 16. In one example, the magazine assembly 18 can include two opposing magazine side walls 24 that define a magazine track 26 therebetween. As can be appreciated, the magazine track 26 is sized accordingly to maintain the nails 30 that are inserted into the magazine assembly 18 in an upright sequential position when the nails enter the nosepiece assembly 16. To assist in this regard, the magazine assembly 18 can include a pusher assembly 28. The pusher assembly 28 can include one or more elements that fit within the magazine track 26 and exert a force against the nails 30 to urge the nails 30 toward the nosepiece assembly 16 in the magazine track 26.

In one example, as shown in FIGS. 1-9, the nailer 10 can accept one or more strips of collated nails 30 in the magazine assembly 18. In general, collated nails are individual nails 32 that are connected to one another via a substrate or collation 34. The collated nails 32 are easier to load into the magazine assembly 18 than individual nails. In addition, the collated strip of nails 32 can be loaded into the magazine assembly 18 more quickly than if the nails 32 are inserted individually. Various types of collated nails 30 can be used such as nails connected together by plastic, paper, wire or other materials forming the substrate or collation 34. In the example shown, the collated strip of nails 30 connects the nails 32 together using a plastic collation 34. The collation 34 includes sleeves 40 that hold the shafts 38 of the nails 32 and bridge portions 42 that connect adjacent sleeves 40 to each other. The nails 32 are held in a position such that the center axes of the shafts 38 are positioned parallel to each other and the heads 36 of the nails 32 are positioned adjacent and overlapping one another as shown.

Figure 4:
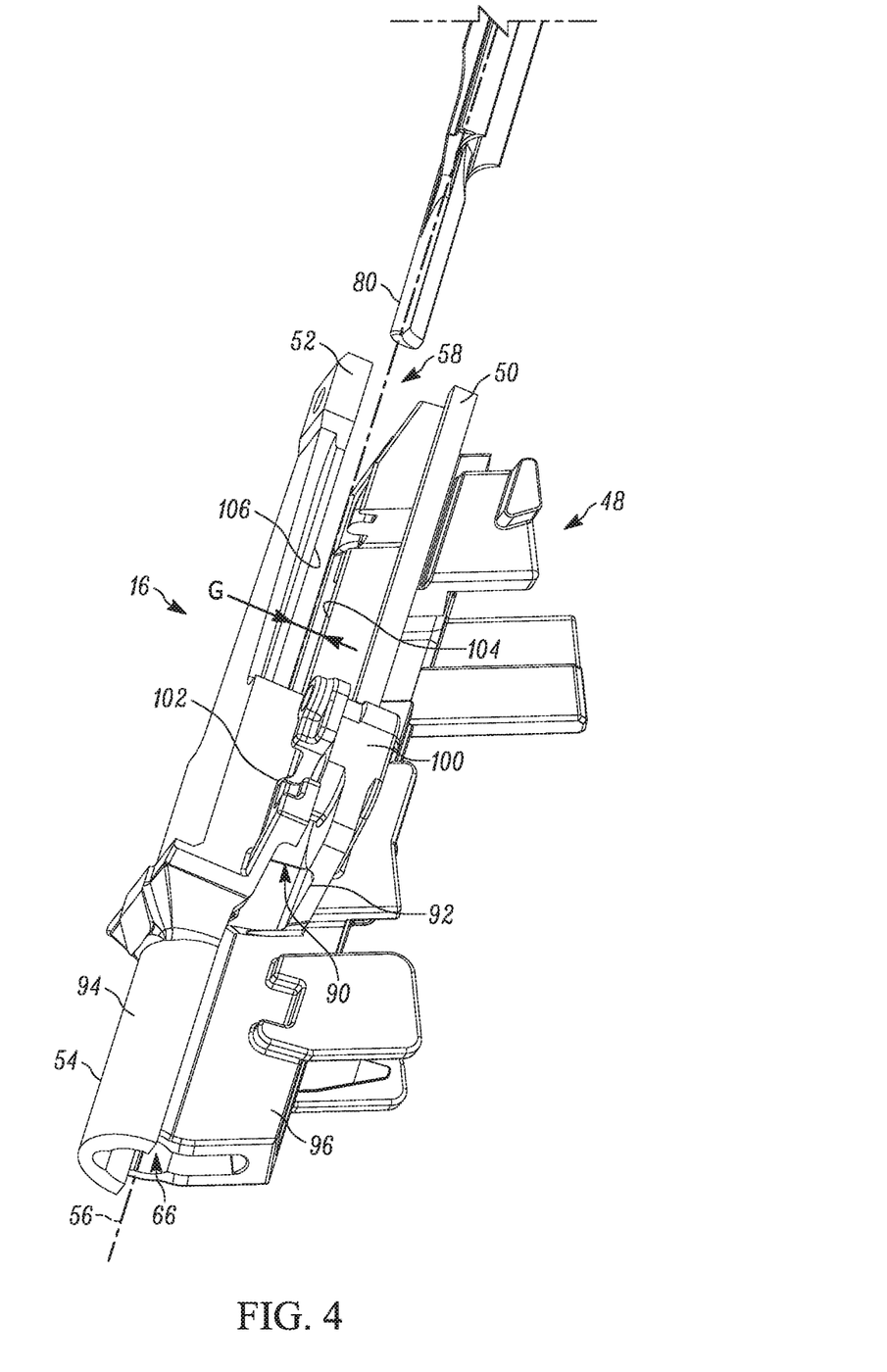
FIG. 4 is a perspective view of an example nosepiece assembly in accordance with the teachings of the present disclosure.
Figure 5:
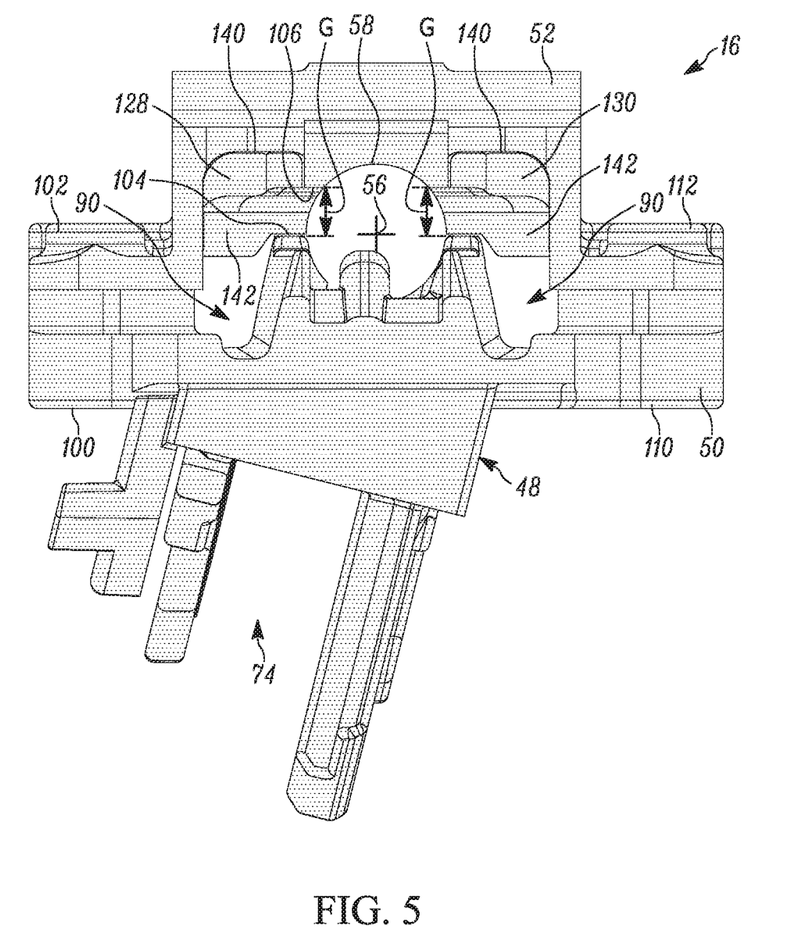
FIG. 5 is top view of the nosepiece assembly of FIG. 4.

As stated above, one or more collated strips of nails 30 can be inserted into the magazine assembly 18. The one or more collated strips of nails 30 can be inserted through the top of the magazine assembly 18 and then guided longitudinally along the magazine track 26 into the nosepiece assembly 16. The nosepiece assembly 16, as shown in FIG. 4, can include a first nosepiece portion 50 and a second nosepiece portion 52. The first nosepiece portion 50 and the second nosepiece portion 52 can be coupled together and can be connected to the nailer 10. The nosepiece assembly 16 can receive the nails 32 from the magazine assembly 18 and guide the nails 32 from a nose 54 of the nailer 10 when the nails 32 are driven into a workpiece by the drive motor assembly 14.

As shown in FIG. 2, the nails 32 of the collated strip of nails 30 follow a path along the magazine assembly 18 and into the first nosepiece portion 50. The first nosepiece portion 50, in the example shown, includes a magazine connector 48. The magazine connector 48 is sized to receive and/or connect to the magazine assembly 18. In this manner, the nails 32 can move from the magazine assembly 18 and into the magazine connector 48. The magazine connector 48 can include a first guide wall 70 and a second guide wall 72 (FIGS. 5 and 6) that define a fastener guide 74 in the first nosepiece portion 50. The first guide wall 70 and the second guide wall 72 are spaced apart from one another such that the nails 32 can slide between the first guide wall 70 and the second guide wall 72. The first guide wall 70 and the second guide wall 72 can also include a first support ledge 76 and a second support ledge 78 (FIG. 7) that project toward one another in the fastener guide 74. The first support ledge 76 and the second support ledge 78 can be spaced apart by a ledge width that is smaller than an outer diameter of the heads 36 of the nails 32. In this manner, the nails 32 can be supported by the first support ledge 76 and/or the second support ledge 78 in the fastener guide 74.

Referring back to FIG. 2, in the example shown, the fastener guide 74 extends through the first nosepiece portion 50 to the drive channel 58. As such, the nails 32 can travel through the fastener guide 74 and be positioned in the drive channel 58. As shown, a first nail 82 of the collated strip of nails 30 is positioned in the drive channel 58 and is in a drive-ready position to be driven longitudinally through the drive channel 58 in a direction along the center axis 56.

The drive channel 58 can be positioned between the first nosepiece portion 50 and the second nosepiece portion 52. The drive channel 58, in this example, extends longitudinally along the center axis 56 and defines a path through which the nails 32 travel when the drive blade 80 (FIG. 4) is driven through the drive channel 58 by the drive motor assembly 14.

When the drive blade 80 contacts the first nail 82 in the drive channel 58, the first nail 82 is sheared from the collated strip of nails 32. The collation 34 can break at the bridge portion 42 that connects the sleeve 40 of the first nail 82 to the sleeve 40 of the adjacent nail. When the bridge portion 42 breaks from the collation 34, the bridge portion 42, the sleeve 40 or other portions of the collation 34 can break away from the collation 34 and create debris that can "float" in the drive channel 58. Such debris can collect in the drive channel 58 and can cause the nails 32 to jam or to cause improper feeding of the nails 32 into the drive channel 58. Such operational problems are particularly likely to occur if the nailer 10 is operated in quick succession such that multiple nails 32 are driven out of the nailer 10 rapidly. In such circumstances, the broken pieces of the collations 34 or other debris can collect inside the drive channel 58.

The debris that may collect in the drive channel 58 can fall out of the drive channel 58 due to gravity or due to the movement of the nails 32 through the drive channel 58 during operation of the nailer 10. The drive channel 58, however, can become clogged, for example, when the debris does not have an opportunity to move out of the drive channel 58 through its distal opening 66 or when enough pieces of debris are generated that the debris becomes lodged inside the drive channel 58.

As shown in FIGS. 3-9, the nosepiece assembly 16 of the present disclosure can include one or more debris ejection passages 90 through which the debris can escape from the drive channel 58. Such debris ejection passages 90 provide additional paths/openings (beyond the drive channel/distal opening 66) by which the debris can escape from the drive channel 58. This can significantly reduce the likelihood that the broken pieces of the collation 34 or other debris will clog, jam or cause other operational issues with the nailer 10.

Figure 3:
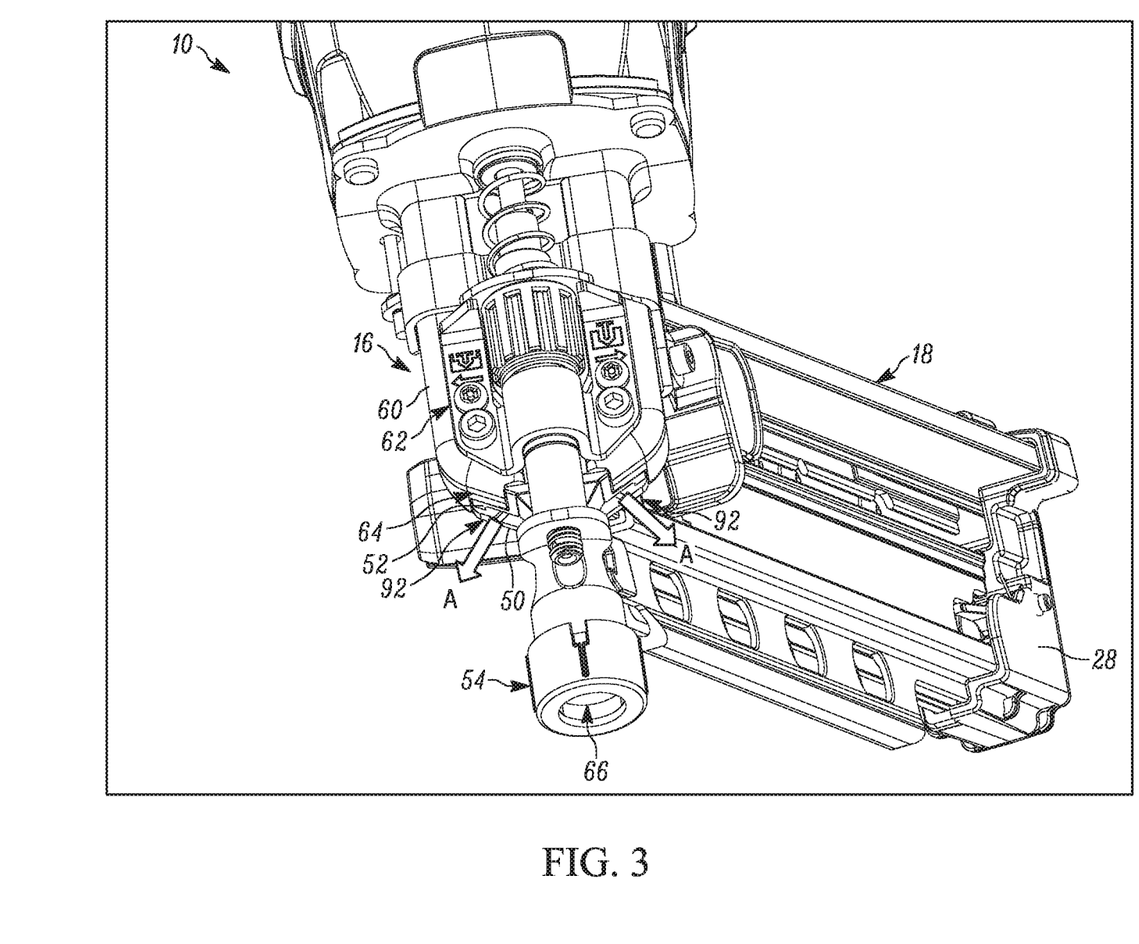
FIG. 3 is a perspective view of the powered nailer of FIG. 1 showing the nosepiece assembly with debris ejection apertures located therein.

As shown in FIGS. 2 and 3, a nosepiece shell 60 can be connected over a portion of the first nosepiece portion 50 and the second nosepiece portion 52. A contact trip assembly 62 can be connected to the nosepiece shell 60 and/or to the first nosepiece portion 50 and/or the second nosepiece portion 52. The contact trip assembly 62 can be coupled to an activation switch that can cause the drive motor assembly 14 to move to an active state from an inactive state. In the active state, the nailer 10 will drive a nail 32 into a workpiece in response to a user depressing the trigger of the nailer 10. In the inactive state, the nailer 10 will not drive a nail 32 into a workpiece in response to a user depressing the trigger of the nailer 10. As can be appreciated, one or more components of the contact trip assembly 62 can move longitudinally when the nailer 10 is pressed against a workpiece. When the nailer 10 is pressed against a workpiece, the contact trip assembly 62 moves the drive motor assembly 14 to the active state to enable the drive blade 80 to drive a nail 32 into the workpiece.

The nosepiece assembly 16, in this example, includes two debris ejection passages 90 that extend from the drive channel 58 to two debris ejection apertures 92. As can be seen in FIG. 3, the debris ejection apertures 92 are positioned on opposing lateral sides of the nosepiece assembly 16. As will be further explained below, the debris ejection apertures 92 are openings through which the debris can travel from the drive channel 58 out of the nosepiece assembly 16 (as shown by the arrows A) to help prevent clogging, jamming or other operational issues. The debris ejection apertures can be positioned on a nose-facing exterior surface 64 of the nosepiece assembly 16, and can be spaced above the workpiece (or the distal opening 66 of the nose 54) such that the debris ejection apertures 92 guide debris toward a workpiece and away from a user.

With reference to FIG. 4, the nosepiece assembly 16 can include the first nosepiece portion 50 connected to the second nosepiece portion 52. The drive channel 58 can be positioned between the first nosepiece portion 50 and the second nosepiece portion 52. The drive channel 58 extends longitudinally toward, and terminates at the distal opening 66 at, the nose 54. As shown, the nose 54 is defined by a cylindrical nose wall 94 on the second nosepiece portion 52 and an opposing nose wall 96 on the first nosepiece portion 50 with the drive channel 58 and distal opening 66 therebetween. The nose wall 94 and the opposing nose wall 96 are positioned adjacent one another to define the distal opening 66. As can be appreciated, the nail 32 exits the nosepiece assembly 16 through the distal opening 66.

In the orientation of the nosepiece assembly 16 shown in FIG. 4, the debris ejection aperture 92 is positioned longitudinally above the nose 54. In this position, the debris ejection aperture 92 is longitudinally positioned between the nose 54 and the magazine connector 48. As further shown in this example and illustrated in FIGS. 4-6, a first channel edge 104 projects toward the second nosepiece portion 52 from the first nosepiece portion 50 and extends longitudinally in a direction substantially parallel to the center axis 56. A corresponding and opposing second channel edge 106 projects toward the first nosepiece portion 50 from second nosepiece portion 52 in a position substantially parallel to the first channel edge 104 on a side of the drive channel 58 opposite to the first channel edge 104. The first channel edge 104 and the second channel edge 106 are separated from each other by a gap G. The first channel edge 104 and the second channel edge 106 are separated by the gap G at a longitudinal height adjacent to the magazine connector 48. The gap G is present longitudinally along opposing surfaces of the first channel edge 104 and the second channel edge 106 at a position adjacent to the fastener guide 74 in the drive channel 58. As such, the first channel edge 104 and the second channel edge 106 define a debris opening through which debris that is creating during the nail driving process can move laterally from the drive channel 58 (i.e. outward from the center axis 56) and into the debris ejection passage(s) 90.

In the example shown, the debris ejection aperture 92 (and the debris ejection passage 90) can be defined, at least in part, by a first connector wing 100 of the first nosepiece portion 50 and a first connector extension 102 on the second nosepiece portion 52. A second and opposing debris ejection aperture 92 (and a second and opposing debris ejection passage 90) can be positioned on an opposite side of the nosepiece assembly 16 and can be defined, at least in part, by a second connector wing 110 and a second connector extension 112. As shown, the debris ejection passages 90 are positioned laterally outward of the drive channel 58. Debris can move from the drive channel 58 through the gap G and into the debris ejection passages 90. The debris can move in a debris ejection path from the drive channel 58 at a longitudinal height adjacent to the magazine connector 48 outward and into the debris ejection passages 90 and away from the nosepiece assembly 16 through debris ejection apertures 92.

Figure 6:
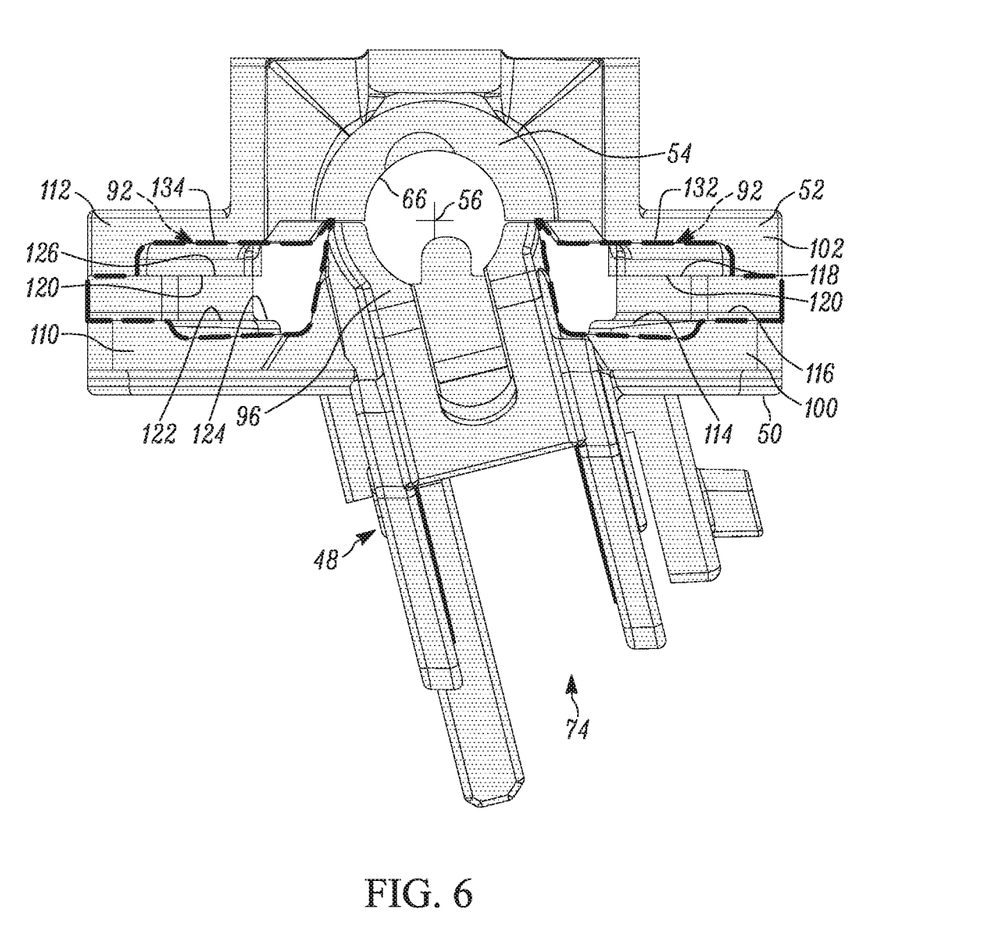
FIG. 6 is a bottom view of the nosepiece assembly of FIG. 4.
Figure 7:
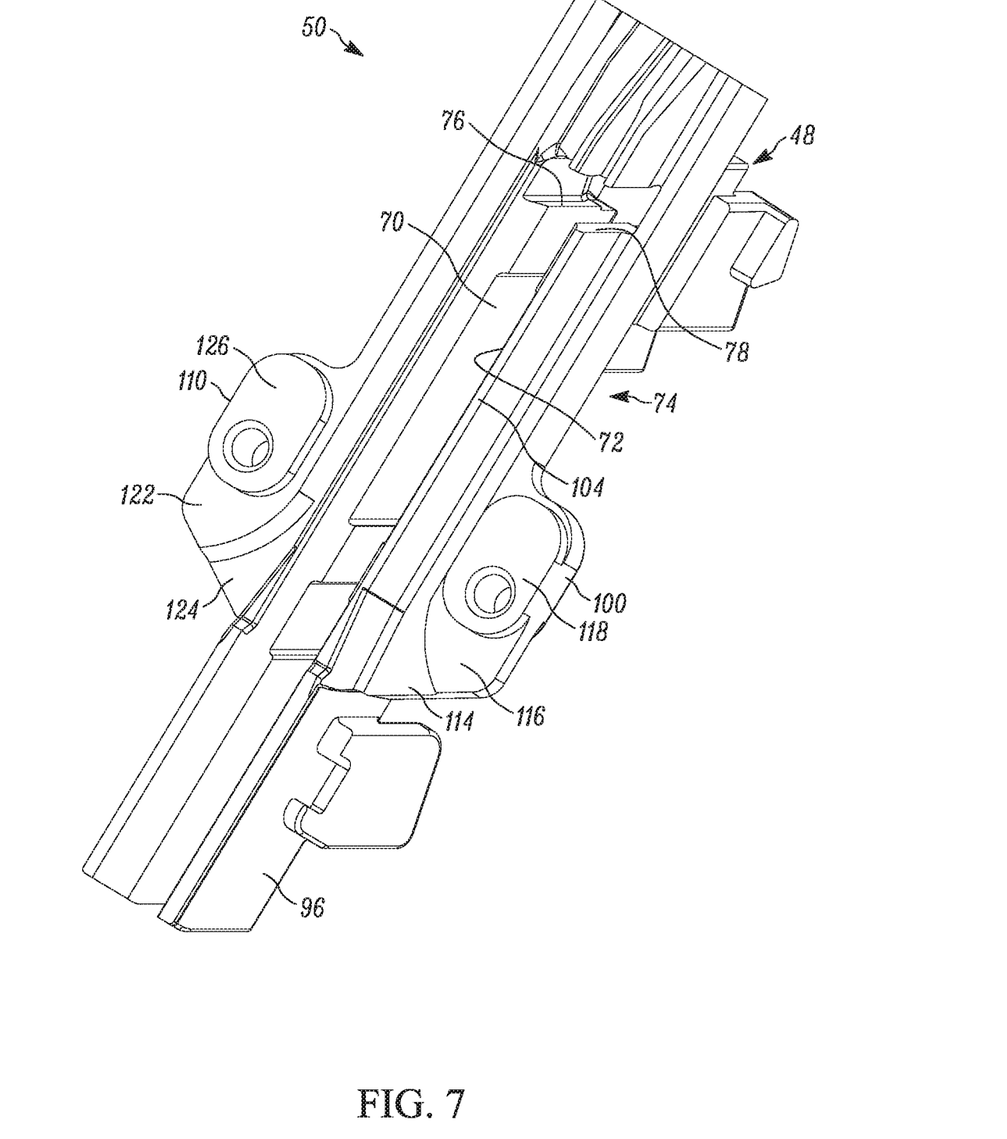
FIG. 7 is a perspective view of a first nosepiece portion of the nosepiece assembly of FIG. 4.

With reference to FIG. 7, the first nosepiece portion 50 can include one or more features on the first connector wing 100 and/or on the second connector wing 110 to guide the debris away from the drive channel 58. In the example shown in FIG. 7, the first nosepiece portion 50 can include an inward recessed surface 114 and an outward recessed surface 116. The inward recessed surface 114 and the outward recessed surface 116 are recessed from a mating plane defined by a mating surface 118 of the first connector wing 100. The inward recessed surface 114 can be recessed away from the mating plane more than that of the outward recessed surface 116. As shown in FIG. 6, for example, the mating surface 118 of the first connector wing 100 mates to a complimentary mating surface 120 of the first connector extension 102 (i.e., the mating plane). The outward recessed surface 116 and the inward recessed surface 114 are recessed in a direction substantially perpendicular to the mating surface plane and away from the second nosepiece portion 52. The inward recessed surface 114 is recessed a greater distance away from the mating surface 118 than the outward recessed surface 116. As shown in FIG. 7, the inward recessed surface 114 can be positioned laterally adjacent to the first channel edge 104 and, in this example, can have a distal end that has a curved shape that curves outwardly away from the drive channel 58. Alternatively, the distal end of the inward recessed surface 114 can have a straight portion that is angled down and outwardly. In addition, the width of the inward recessed surface 114, or the exit opening, or both, can increase toward the distal end of the inward recessed surface 114.

In the example shown, the first nosepiece portion 50 can also include an opposing inward recessed surface 124 and an opposing outward recessed surface 122. The opposing inward recessed surface 124 and the opposing outward recessed surface 122 can be positioned on an opposite lateral side of the nosepiece assembly 16 than the inward recessed surface 114 and the outward recessed surface 116. The opposing inward recessed surface 124 and the opposing outward recessed surface 122 can have shapes and relative positions similar to that previously described. As shown, the opposing inward recessed surface 124 and the opposing outward recessed surface 122 are recessed from a mating surface 126 of the second connector wing 110.

Figure 8:
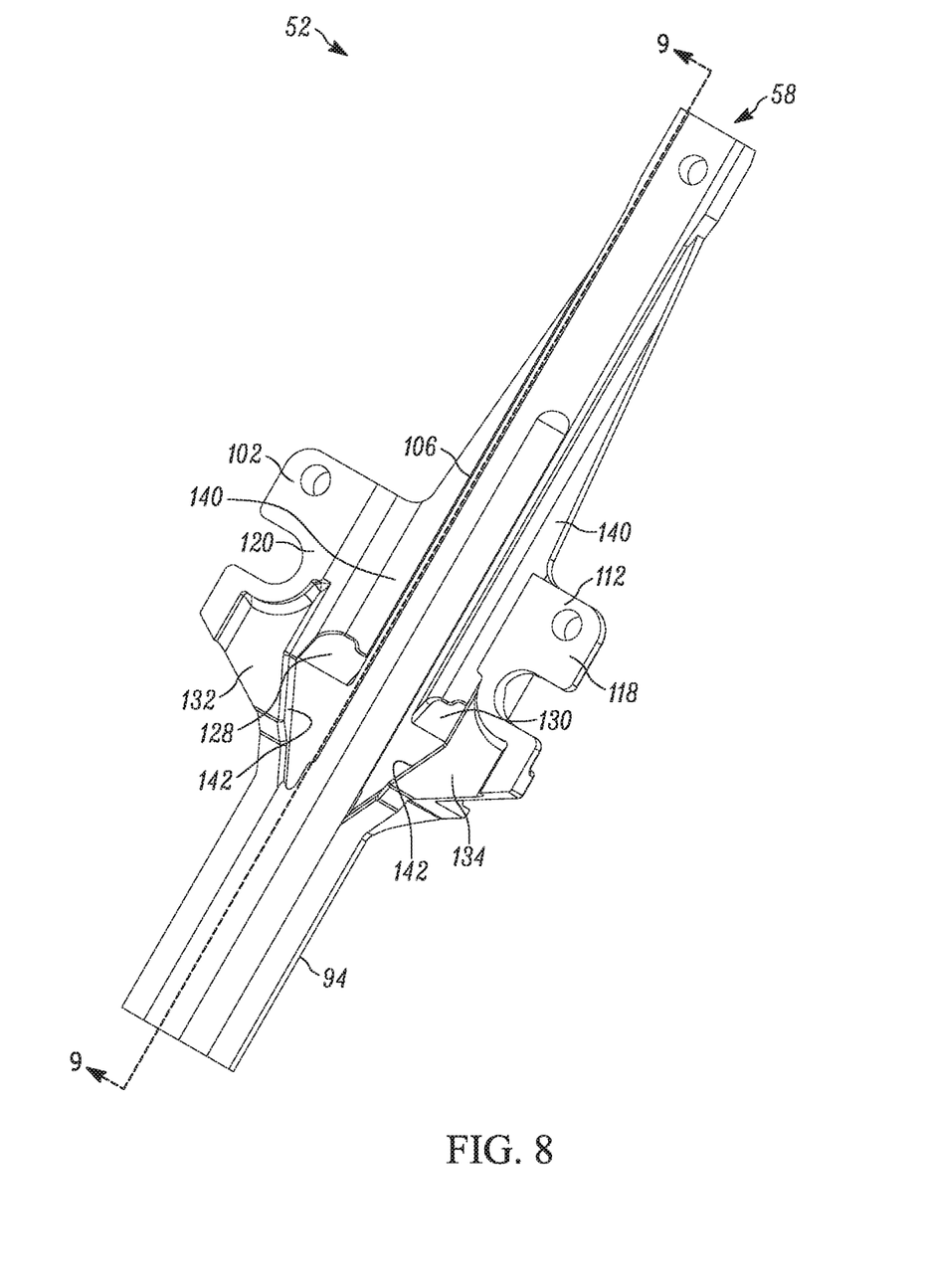
FIG. 8 is a perspective view of a second nosepiece portion of the nosepiece assembly of FIG. 4.

With reference to FIG. 8, the debris ejection passages 90 can also include one or more features to assist in guiding debris from the drive channel 58 and out from the debris ejection apertures 92. As shown, the second nosepiece portion 52 can include a debris guiding ramp 128. The debris guiding ramp 128 can be positioned laterally outward of the drive channel 58. The debris guiding ramp 128 can be angled and/or sloped toward the first nosepiece portion 50 in a longitudinal direction toward the nose wall 94 from a base surface 140 to an inwardly angled surface 142. The base surface 140 is a substantially planar surface on the second nosepiece portion 52 that is positioned laterally outward of the drive channel 58. The inwardly angled surface 142 is positioned between the debris guiding ramp 128 and the nose wall 94. The inwardly angled surface 142 is angled toward the drive channel 58 in a direction toward the nose wall 94. The inwardly angled surface can assist in guiding the nails 32 along the drive channel 58 when the nails 32 are drive out of the nosepiece assembly 16.

Figure 9:
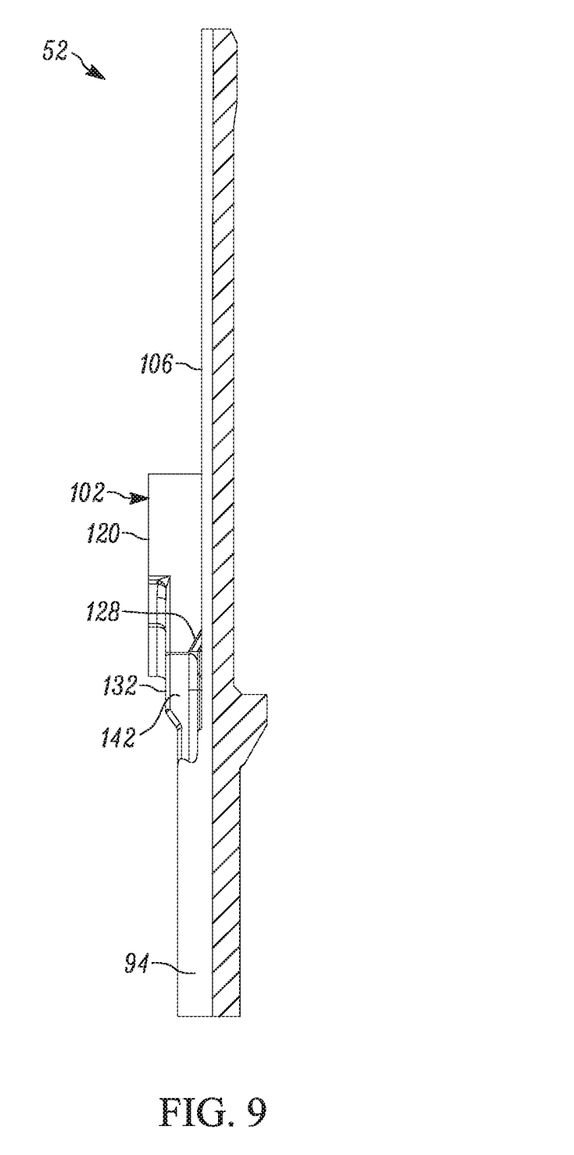
FIG. 9 is a sectional view of the second nosepiece portion cut along the section plane indicated on FIG. 8.

As shown in FIGS. 8 and 9, the debris guiding ramp 128 can slope away from the base surface 140 of the second nosepiece portion 52. The debris guiding ramp 128 can guide debris that exits the drive channel 58 in a direction toward the debris ejection aperture 92 and/or assist in preventing debris from becoming lodged or from accumulating in the debris ejection passage 90.

As further shown in this example, the second nosepiece portion 52 can include a recessed platform 132. The recessed platform 132 is a portion of the first connector extension 102 that is recessed from the complimentary mating surface 120 of the first connector extension 102. The recessed platform 132 is positioned opposite to the outward recessed surface 122 and the inward recessed surface 124 in the nosepiece assembly 16. As shown in FIG. 6, the recessed platform 132, the outward recessed surface 122 and the inward recessed surface 124 are recessed from the mating surfaces of the first nosepiece portion 50 and the second nosepiece portion 52 in opposing directions such that they define the debris ejection aperture 92.

As further shown, the second nosepiece portion 52 can include an opposing debris guiding ramp 130 and an opposing recessed platform 134. The opposing debris guiding ramp 130 and the opposing recessed platform 134 can be positioned and have shapes similar to that previously described with respect to the debris guiding ramp 128 and the recessed platform 132. The opposing debris guiding ramp 130 and the opposing recessed platform 134, however, are positioned on an opposite lateral side of the drive channel 58 from the debris guiding ramp 128 and the recessed platform 132.

In other examples, the nosepiece assembly 16 can include other ramps, recesses and guiding features that guide debris that may be contained inside the drive channel 58 out of or away from the drive channel 58. The debris ejection passages 90 and/or the debris ejection apertures 92 can have other shapes and profiles to assist in diverting debris away from the drive channel 58 and/or insuring smooth passage of debris through the passages.

Figure 10:
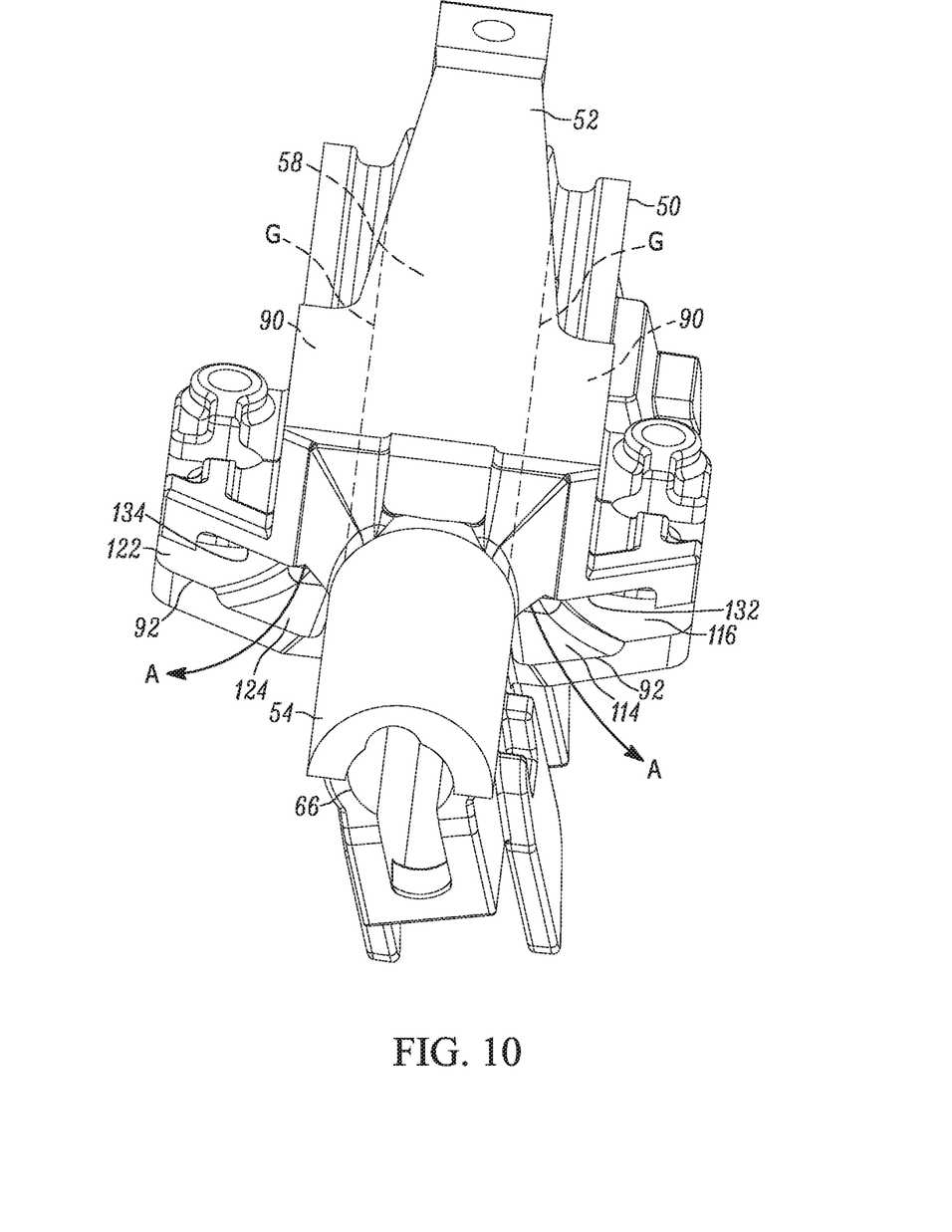
FIG. 10 is a perspective view of the nosepiece assembly of FIG. 4 showing example debris ejection paths.

As shown in FIG. 10, the nosepiece assembly 16 can define debris ejection pathways (as indicated by the arrows A) from the drive channel 58 through the debris ejection passages 90 to permit the debris to exit from the nosepiece assembly 16 through the debris ejection apertures 92. As can be seen, the debris ejection passages 90 are positioned laterally outward of the drive channel 58. The debris ejection apertures 92 are positioned laterally outward of the distal opening 66 of the drive channel 58 at the nose 54. The debris ejection apertures 92 are longitudinally spaced apart from the distal opening 66 so that debris can exit from the debris ejection apertures 92 when the nose 54 is contacting (or is proximate to) a workpiece.

The foregoing description of an example embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a different embodiment, even if not specifically shown or described. The same may also be varied in many ways. Such variations are not to be regarded as a departure from the disclosure, and all such modifications are intended to be included within the scope of the disclosure.

What is claimed is:

1. A nosepiece assembly comprising:
   a first nosepiece portion including a fastener guide, the fastener guide having a support ledge to position a first fastener of a collated strip of fasteners in a drive channel; and
   a second nosepiece portion connected to the first nosepiece portion opposite to the fastener guide with the first and second nosepiece portions defining the drive channel therebetween and defining a debris ejection passage therebetween, the debris ejection passage extending between the drive channel and a debris ejection aperture on an exterior surface of the nosepiece assembly;
   wherein the first and second nosepiece portions further define a nose with a distal opening from which the first fastener is driven from the nosepiece assembly, and the debris ejection aperture is positioned between the support ledge and the distal opening.

2. The nosepiece assembly of claim 1 wherein the debris ejection aperture is spaced apart from the distal opening of the nose.

3. The nosepiece assembly of claim 2 wherein the first nosepiece portion and the second nosepiece portion further define a second debris ejection passage, the second debris ejection passage extending between the drive channel and a second debris ejection aperture on a side of the nosepiece assembly opposite to the debris ejection passage.

4. The nosepiece assembly of claim 3 wherein the second nosepiece portion includes a pair of debris guiding ramps positioned on opposite sides of the drive channel, the pair of debris guiding ramps sloped toward the first nosepiece portion.

5. The nosepiece assembly of claim 1 wherein the debris ejection aperture is positioned laterally outward of the drive channel.

6. The nosepiece assembly of claim 1 wherein the debris ejection passage is defined by an inward recessed surface positioned laterally outward of the drive channel.

7. The nosepiece assembly of claim 6 wherein the inward recessed surface flares outward and away from the drive channel to guide debris away from the drive channel.

8. The nosepiece assembly of claim 1 wherein the second nosepiece portion includes a debris guiding ramp positioned laterally outward of the drive channel in the debris ejection passage, the debris guiding ramp sloped toward the first nosepiece portion.

9. The nosepiece assembly of claim 1 wherein the debris ejection passage includes one or more ramps to guide debris away from the drive channel.

10. The nosepiece assembly of claim 1 wherein the debris ejection passage extends laterally outward of and along a portion of the drive channel.

11. A powered fastening device nosepiece assembly comprising,
    a drive channel defined by a first nosepiece portion and a second nosepiece portion, the drive channel extending longitudinally between the first nosepiece portion and the second nosepiece portion and being adapted to receive a drive blade that moves longitudinally in the drive channel toward a workpiece contacting nose to cause a first fastener of a collated strip of fasteners to be driven from the nosepiece assembly through a fastener ejection aperture of the workpiece contacting nose and into a workpiece,
    wherein the first nosepiece portion and the second nosepiece portion define a debris ejection passage that is in communication with the drive channel and positioned outward therefrom such that debris located in the drive channel exits from the nosepiece assembly in a direction outward from the drive channel through a debris ejection aperture of the debris ejection passage; and wherein the debris ejection aperture is spaced away from the workpiece contacting nose of the nosepiece assembly.

12. The powered fastening device nosepiece assembly of claim 11 wherein the debris ejection passage extends from the drive channel to the debris ejection aperture on a nose-facing surface of the nosepiece assembly.

13. The powered fastening device nosepiece assembly of claim 11 wherein the debris ejection passage extends laterally outward from the drive channel.

14. The powered fastening device nosepiece assembly of claim 11 wherein the first nosepiece portion and the second nosepiece portion further define a second debris ejection passage that is in communication with the drive channel and positioned outward therefrom on a lateral side of the nosepiece assembly opposite to the debris ejection passage.

15. The powered fastening device nosepiece assembly of claim 11 wherein:
the first nosepiece portion includes a first channel edge and the second nosepiece portion includes a second channel edge, the first channel edge and the second channel edge being spaced apart from one another along an upper region of the drive channel to define a gap, the gap connecting the drive channel to the debris ejection passage to permit debris to pass from the drive channel into the debris ejection passage.

16. The powered fastening device nosepiece assembly of claim 11 wherein the first nosepiece portion and the second nosepiece portion are positioned adjacent to one another to substantially enclose the drive channel at the nose.

17. A powered fastening device nosepiece assembly comprising:
a drive channel defined by a first nosepiece portion and a second nosepiece portion, the drive channel extending longitudinally between the first nosepiece portion and the second nosepiece portion and being adapted to receive a drive blade that moves longitudinally in the drive channel toward a nose to cause a first fastener of a collated strip of fasteners to be driven from the nose and into a workpiece,
wherein the first nosepiece portion and the second nosepiece portion define a debris ejection passage that is in communication with the drive channel and positioned outward therefrom such that debris located in the drive channel exits from the nosepiece assembly in a direction outward from the drive channel through the debris ejection passage and a debris guiding ramp is positioned in the debris ejection passage.

18. The powered fastening device nosepiece assembly of claim 17 wherein the debris guiding ramp is positioned laterally outward of the drive channel and is angled away from the second nosepiece portion and toward a debris ejection aperture of the debris ejection passage to guide debris out of the nosepiece assembly.

\* \* \* \* \*